(No Model.) 4 Sheets—Sheet 1.
J. HARTNESS.
FLUID CONTROLLED CLUTCH AND SPEED REGULATOR.
No. 541,483. Patented June 25, 1895.
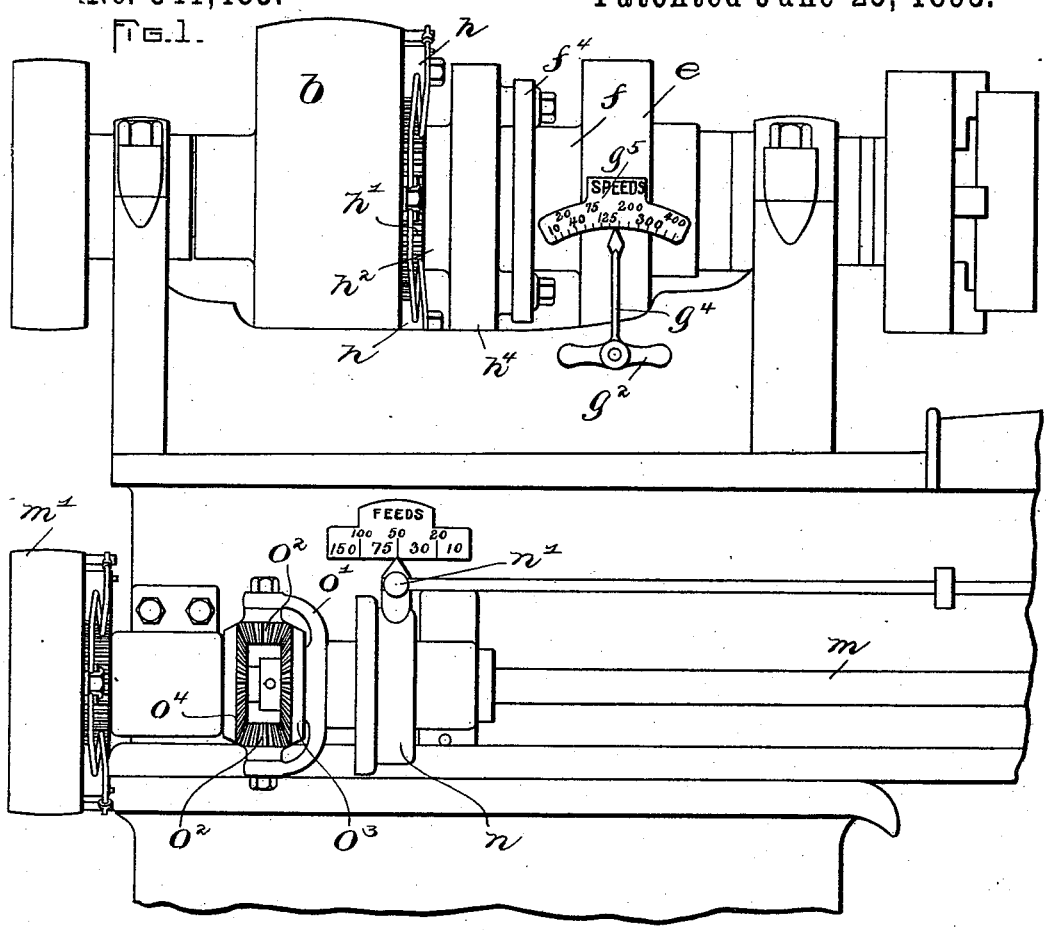
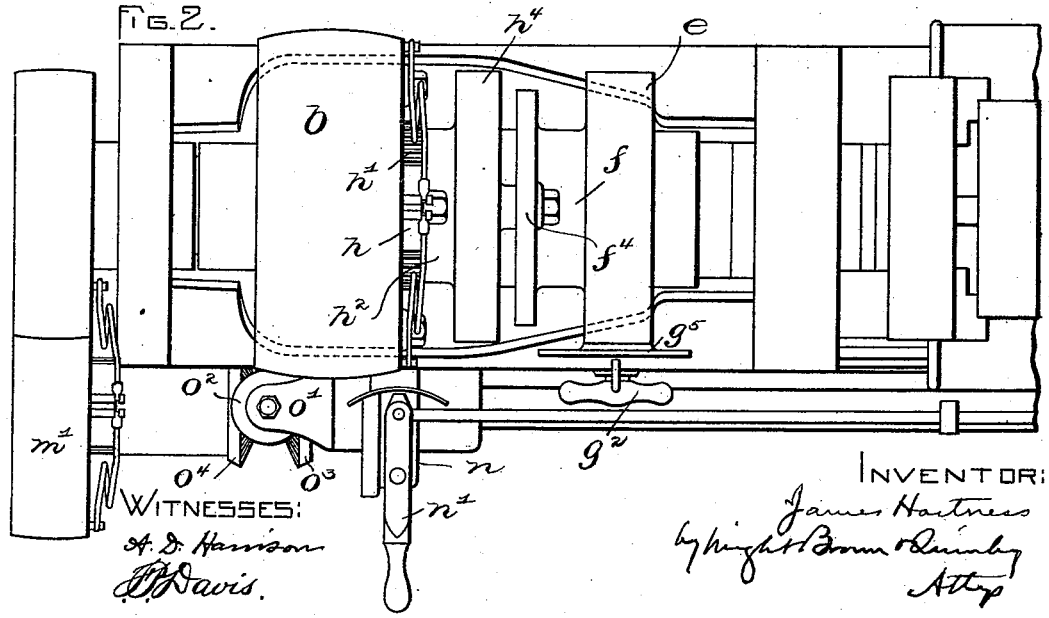
WITNESSES:
A. D. Harrison
T. Davis.
INVENTOR:
James Hartness
by Wright Brown & Quinby
Attys (No Model.) 4 Sheets—Sheet 2.
J. HARTNESS.
FLUID CONTROLLED CLUTCH AND SPEED REGULATOR.
No. 541,483. Patented June 25, 1895.
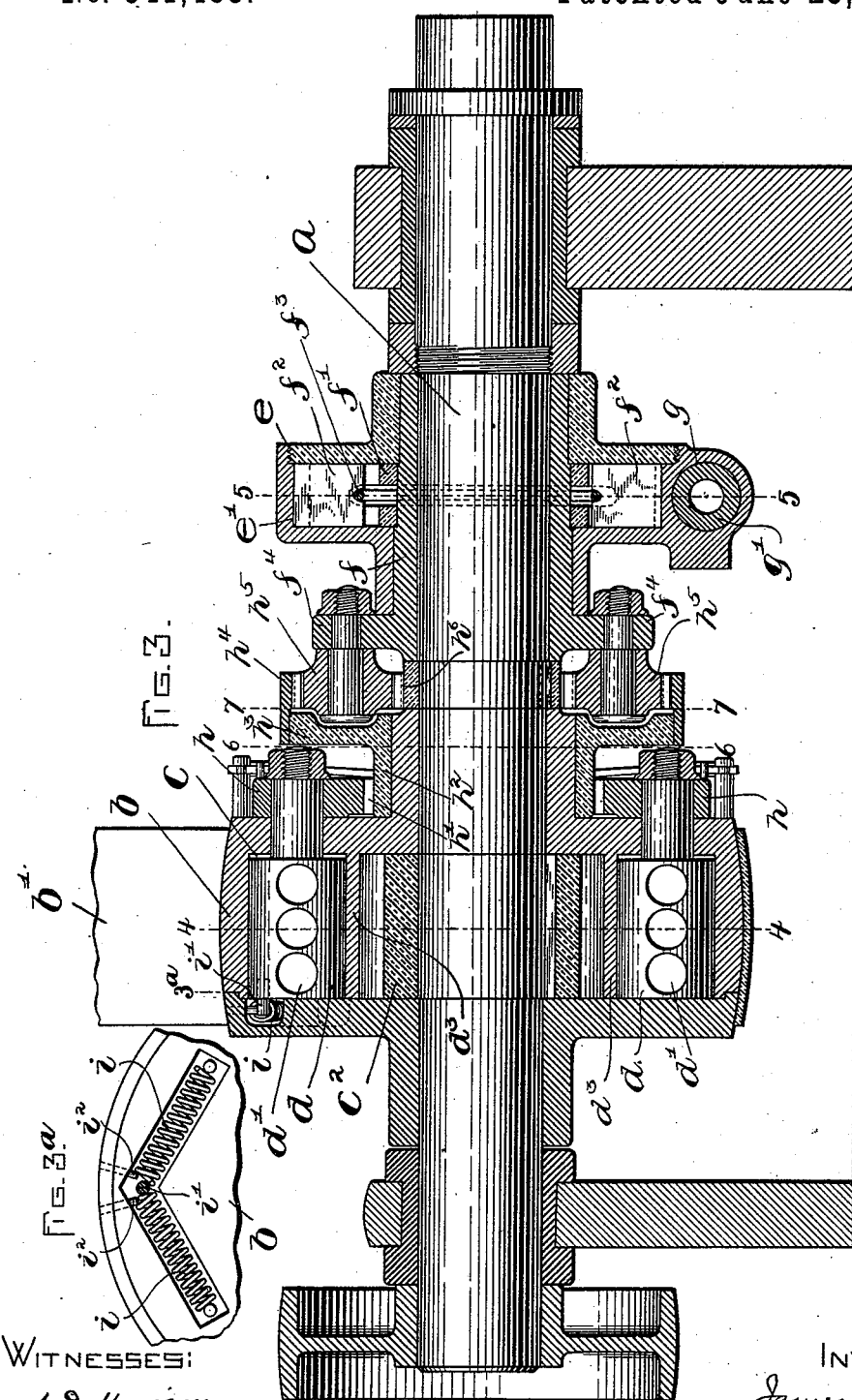
Witnesses:
A. D. Harrison
F. P. Davis
Inventor:
James Hartness
by Wright Brown & Quinby
Attys (No Model.) 4 Sheets—Sheet 3.
J. HARTNESS.
FLUID CONTROLLED CLUTCH AND SPEED REGULATOR.
No. 541,483. Patented June 25, 1895.
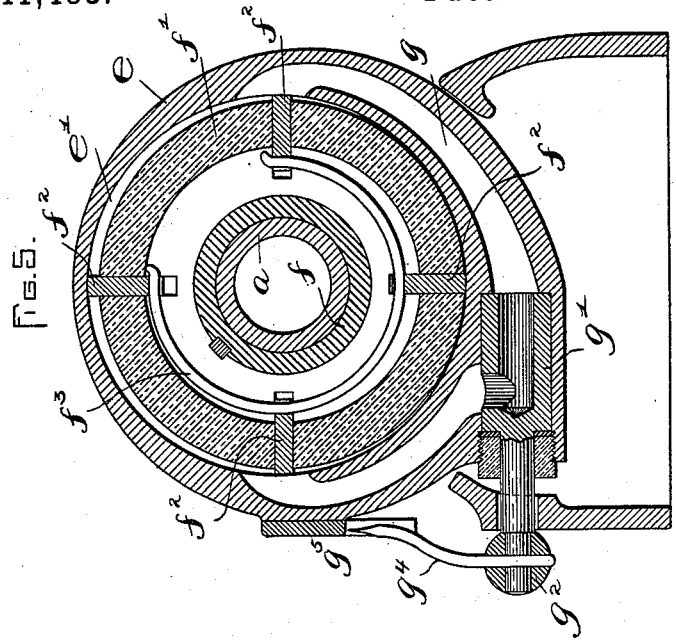
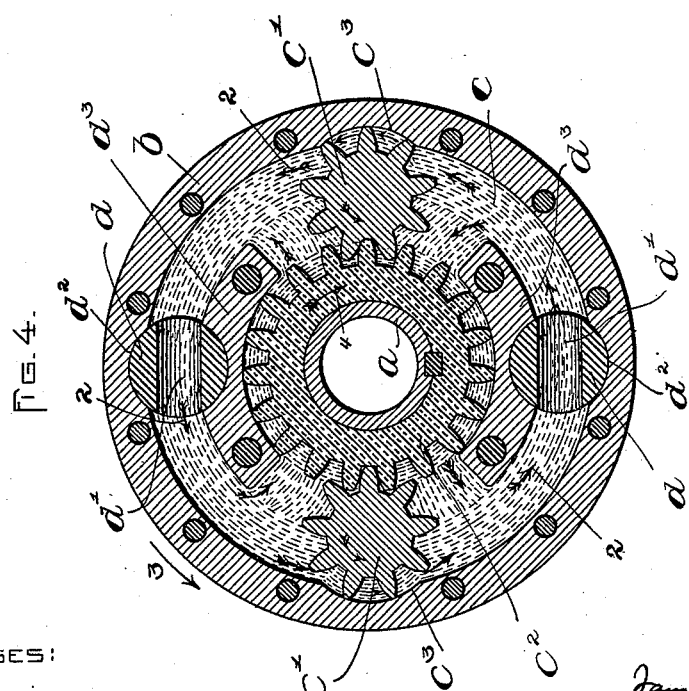
Witnesses:
Inventor:

(No Model.) 4 Sheets—Sheet 4.
J. HARTNESS.
FLUID CONTROLLED CLUTCH AND SPEED REGULATOR.
No. 541,483. Patented June 25, 1895.
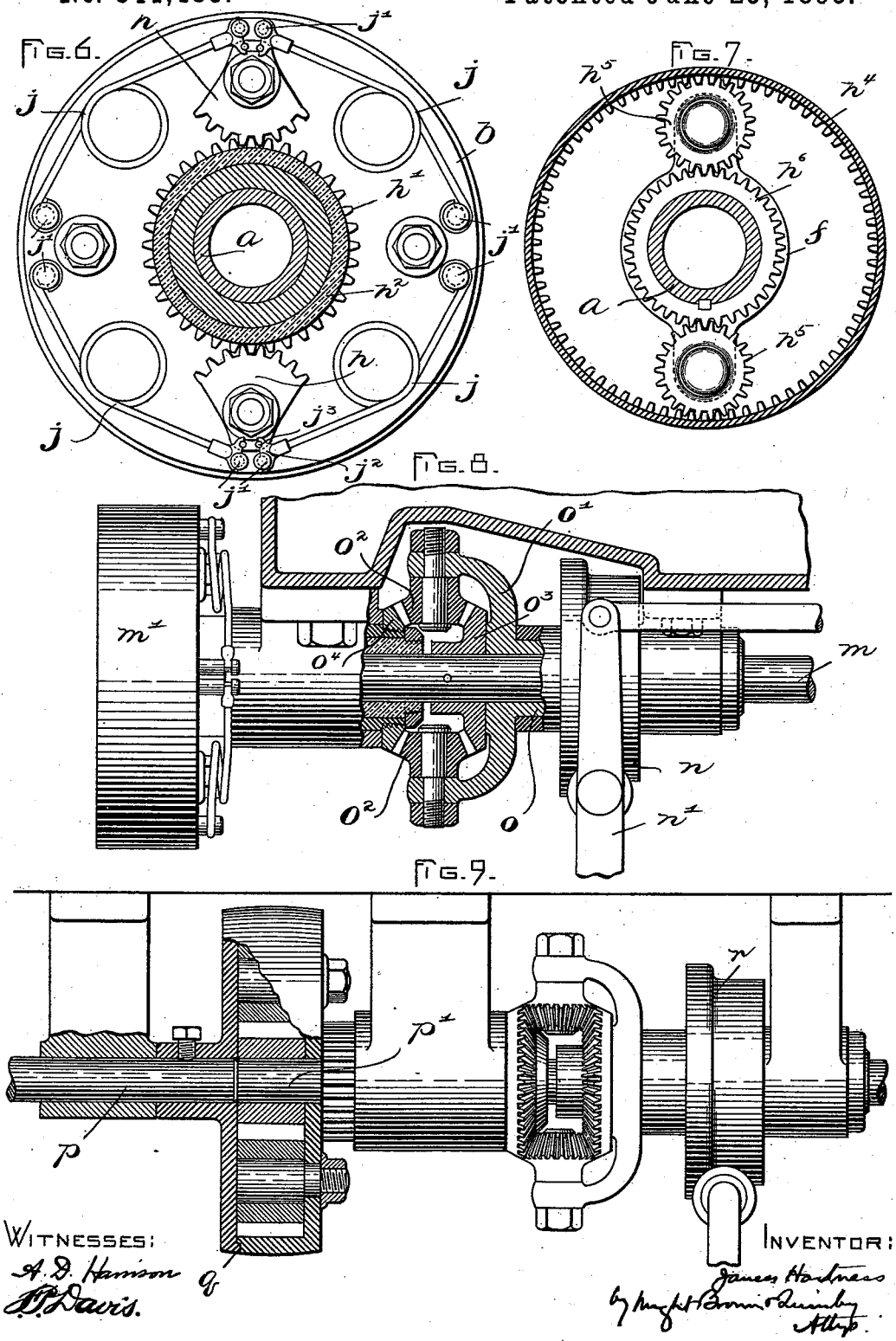
WITNESSES: INVENTOR:

UNITED STATES PATENT OFFICE.

JAMES HARTNESS, OF SPRINGFIELD, VERMONT.

FLUID-CONTROLLED CLUTCH AND SPEED-REGULATOR.

SPECIFICATION forming part of Letters Patent No. 541,483, dated June 25, 1895.

Application filed July 12, 1894. Serial No. 517,296. (No model.)

*To all whom it may concern:*

Be it known that I, JAMES HARTNESS, of Springfield, in the county of Windsor and State of Vermont, have invented certain new and useful Improvements in Fluid-Controlled Clutches and Speed-Regulators, of which the following is a specification.

The present invention contemplates controlling connection between driving and driven machine-parts through the agency of fluid, whereby any relative speeds of the parts can be obtained.

The invention is capable of use in numerous connections as, for example, in a lathe for connecting the spindle with its driver; and in this connection it dispenses with back-gears and cone-pulleys universally employed at present to obtain variations in the speed of the spindle.

The invention is also applicable to the feed-rod of a lathe for connecting it with its driver, and may be employed as a clutch to connect shafting.

All the above enumerated applications of the invention are illustrated in the accompanying drawings, and described hereinafter. Aside from these special applications of the invention, it is capable of use in numerous other connections, as a cut-off coupling and speed-regulator.

The invention may be said to consist broadly in the combination with rotary driving and driven machine elements, as a pulley and shaft, of a circulating pump adapted to be put in operation by movement of one of said elements relative to the other, means for restricting circulation in the pump to establish rotative connection between the elements, a governor pump having a piston or pistons connected through differential gearing with both the driving and the driven elements and with the aforesaid restricting means, and means for restricting circulation in the governor-pump, the restriction of circulation in the governor-pump operating the restricting means in the power-transmitting pump through the differential gearing and the connection of said gearing with the driving and driven elements maintaining the restricting means of the power-transmitting pump at the adjustment to which said means are brought by the restriction of circulation in the governor-pump.

The drawings accompanying this specification and forming part thereof illustrate constructions embodying the invention.

Figure 1 represents in side or front elevation a portion of a turret-lathe to which the invention is applied. Fig. 2 represents a plan view of the same. Fig. 3 represents a longitudinal section of parts surrounding the lathe-spindle. Fig. 3$^a$ shows a detail of a certain arrangement of springs, taken on line 3$^a$ 3$^a$ of Fig. 3. Figs. 4, 5, 6, and 7 represent sectional views taken on lines 4 4, 5 5, 6 6, and 7 7 of Fig. 3. Fig. 8 shows a part plan and part sectional view of parts applied to the feed-rod of the lathe. Fig. 9 illustrates, partly in elevation and partly in section, a construction embodying the invention as adapted for connecting two shafts arranged end to end.

The letter $a$ designates the spindle of the lathe, on which is loosely mounted a driving pulley $b$ receiving motion through the medium of a belt $b'$ from any suitable source. Of course this driver is not necessarily a pulley. Its periphery may have gear-teeth or be formed in any other suitable manner to receive power. The pulley incloses an annular chamber $c$ for containing the fluid for the pump, and the latter, as here shown, comprises a pair of gears $c'$ in said chamber and journaled in one side of the pulley. Said gears are located at diametrically opposite points, and at the inner side mesh into a gear $c^2$ affixed on the spindle $a$. It is to be observed that the wall of the chamber $c$ is concaved, as shown at $c^3$ (Fig. 4), for the close engagement of the teeth of the gears $c'$. Under rotation of these gears, their teeth constitute paddles or pistons which act on the fluid in the chamber and circulate the same therein, as indicated by the arrows 2 in Fig. 4.

It being remembered that the pulley $b$ is loosely mounted on the spindle, it will be apparent that in the absence of any resistance to the circulation of the fluid no motion will be transmitted from said pulley to the spindle, but the gear $c^2$ will remain stationary while the gears $c'$ revolve around it, rotating on their own axes. It will also be understood that restriction of the fluid's circulation will establish rotative connection between the pulley and spindle. A complete stoppage of the circulation would cause the spindle to rotate at the same speed as the pulley. Different relative speeds can be obtained by varying the amount of restriction. Hence with suitable governing means, any relative speed of the driving and driven parts can be obtained.

The restricting means here shown in connection with the above described parts are in the form of valves $d$ rotatively fitted in the pulley at diametrically opposite points and extending across the chamber $c$ midway between the gears $c'$. Said valves have transverse ports $d'$ for the passage of the fluid, and by turning the valves, the area of port-opening can be varied. The valves are supported at the outer sides by the wall of the chamber, which is concaved, as shown at $d^2$, to secure a close fit of the valves, and the inner sides of the valves are correspondingly supported by segmental webs or flanges $d^3$ extending across the chamber, and their inner surfaces constructed for a close fit of the teeth of the gear $c^2$.

Fig. 4 represents the valves positioned to permit free circulation of the fluid, the pulley $b$ being supposed to be revolving in the direction of the arrow 3. The arrow 4 on the gear $c^2$ indicates the relative direction of rotation of said gear, and not the actual direction of rotation, for it would rotate in the same direction as the pulley, when actuated from the latter.

To establish rotative connection of the pulley and spindle, the valves $d$ are turned, and the circulation of fluid restricted more or less, according to the relative speed desired.

It is desirable to arrange for adjustment of the valves while the parts continue to revolve, and this is accomplished through the agency of a fluid-controlled governor of the following construction and arrangement: A fixed casing $e$ surrounds the spindle and incloses an annular chamber $e'$, whose outer wall is eccentric with respect to the spindle. A sleeve $f$ is loosely mounted on the spindle, and extends through the casing $e$ and carries therein a head $f'$ slotted radially to accommodate paddles or pistons $f^2$ which may slide radially in said slots to maintain engagement with the eccentric wall of the casing. A spring $f^3$ by expansive action constantly presses said paddles outward, said spring engaging notches in the same.

It is to be observed that the periphery of the head $f'$ is concentric with the spindle, and thus eccentric with respect to the outer wall of the chamber $e'$, and said head at one part closely fits said chamber wall and forms an abutment for the fluid in the chamber, which fluid is carried toward this abutment by the paddles or pistons.

A passage $g$ is formed in the casing $e$ connecting portions of the chamber on opposite sides of the abutment, and a cylindrical or plug-valve $g'$ is fitted in said passage and bored longitudinally and transversely to connect the portions of the passage between which it is interposed. The stem of this valve projects through the front of the lathe-bed and carries a handle $g^2$ by which to turn it, and an index-finger $g^4$ for a suitably marked scale $g^5$.

The connection between the governor and the restricting valve is effected through gearing, as follows: The stems of the valves carry segments $h$ in mesh with a gear $h'$ on a sleeve $h^2$ loose on the hub of the pulley, and a head $h^3$ to which is affixed an internal gear $h^4$. The sleeve $f$ is formed with ears $f^4$ which support studs carrying pinions $h^5$ in mesh with the internal gear $h^4$. A gear $h^6$ affixed to the spindle also meshes with the said pinions $h^5$. The valves $d$ are yieldingly held in central position, i. e., with their ports fully open, by any suitable arrangement of springs. Two such arrangements are shown in the drawings. One consists of spiral springs $i$ occupying recesses in the pulley (see Figs. 3 and 3ª) and bearing against a pin $i'$ fastened eccentrically on the end of the valve, and against pins $i^2$ fastened in the pulley. The other arrangement is shown more clearly in Fig. 6, and consists in a pair of bowed springs $j$ for each valve, each supported at its end on pins $j'$ fastened in the pulley, and each having a head $j^2$ bearing against a pin $j^3$ fastened in the segment $h$ on the valve.

It will be seen that the speed of the sleeve $f$ will be controlled by the relative speed of the driving pulley and the spindle, and that retardation of the said sleeve will take effect on the restricting valves and turn the same in accordance with the amount of the retardation, which is produced by restriction of the fluid in the governor.

When the pulley and spindle revolve at the same speed, the sleeve $f$ will also revolve at that speed. When the pulley revolves and the spindle is stationary, the sleeve $f$ revolves at one-half the pulley speed, and at all times when the speeds of the pulley and spindle are different the sleeve revolves at a speed midway between the speeds of those parts. By turning the valve $g'$, the circulation of fluid in the governor pump is restricted, and thereby the sleeve $f$ is retarded, and through the gears $h^5$ and $h^4$ retards the sleeve $h^2$ and causes the valves $d$ to be turned by the gear $h'$ and segments $h$, the springs which hold the valves yielding to the motion of the gears.

Substantially the same appliances as above described in connection with the spindle of the lathe are employed on the feed-rod $m$. The letter $m'$ designates the driving pulley; $n$, the fluid-controlled governor, and $n'$ a handle controlling the restricting valve of said governor. The connection between the governor and the restricting valves of the regulator varies somewhat from that heretofore described, and is best illustrated in Fig. 8. The sleeve $o$ which carries the governor-pistons or paddles has a forked head $o'$, supporting bevel-pinions $o^2$ meshing with a bevel-gear $o^3$ affixed on the feed-rod, and a bevel-gear $o^4$ on the sleeve, in gear with the restricting valves of the regulator, which sleeve corresponds with the sleeve $h^2$ of the spindle apparatus.

An apparatus very similar to that shown in connection with the feed-rod of the lathe is illustrated in Fig. 9, adapted for use as a clutch to connect two shafts $p$ and $p'$, which are disposed end to end, and to regulate their relative speed. A pulley $q$ affixed to one of said shafts incloses a chamber containing a circulating pump connected with the other shaft, and a fluid-controlled governor $r$ is employed to determine the fluid restriction in the pump, said governor being connected with the valves of the latter through bevel gearing, as previously described in connection with the feed-rod of the lathe.

Thus it will be seen that the invention is capable of extensive use as a clutch, and also as a speed-regulator.

It is to be understood that the invention is not limited to any particular style of circulating pump for connecting the driving and driven parts. A pump of the type shown in the governor might be employed, or any other suitable style of pump might be used. Neither is the invention limited to any other details of construction shown or described, for it is capable of embodiment in numerous different forms.

Having thus described my invention, what I claim as new, and desire to secure by Letters Patent, is—

1. The combination with rotary driving and driven machine elements, a circulating pump operated by movement of one of said elements relative to the other, and a valve carried by one of the elements and controlling the circulation in the pump; of a governor-pump, and differential gearing connecting the piston of said governor-pump with the driving and driven elements, its connection with the valve-carrying element being through the valve, and means for restricting the circulation in the governor-pump whereby the differential gearing is caused to shift the valve in the power-transmitting pump to change the relative speeds of the driving and driven elements, a corresponding difference in relative speed of the members of the differential gearing taking place to maintain the valve in the adjustment to which it is brought by the restriction of circulation in the governor-pump.

2. The combination of rotary driving and driven machine-elements, a circulating pump operated by movement of one of said elements relative to the other, a rotary valve carried by one of the elements and controlling the circulation in the pump, said valve having a segment affixed to it, a gear on the other element, a pinion in mesh with said gear, a rotary support for said pinion, an internal gear in mesh with the pinion, a gear in mesh with the valve-segment and connected with one of the two last mentioned parts, a governor-pump having a piston on a rotary support connected with the other of said two parts, and means for restricting circulation in the governor-pump.

3. The combination of a shaft, a hollow driver loosely mounted on the same, a circulating pump in the said driver and arranged to be operated by movement of the driver relative to the shaft, a rotary restricting valve carried by the driver and having a segment affixed to its stem, a loose sleeve having a gear in mesh with said segment and carrying an internal gear, a gear affixed to the shaft, a loose rotary sleeve carrying a pinion in mesh with said latter gear and the internal gear, a circulating pump whose piston or pistons are driven by the pinion-carrying sleeve, and a valve for restricting circulation in the last-named pump.

In testimony whereof I have signed my name to this specification, in the presence of two subscribing witnesses, this 9th day of July, A. D. 1894.

JAMES HARTNESS.

Witnesses:
 FRED. C. DAVIS,
 ANSEL O. COBURN.